United States Patent Office 3,827,902
Patented Aug. 6, 1974

3,827,902
PROCESS FOR PREPARING PIGMENT COMPOSITIONS
Siegfried Schwerin, Hofheim, Taunus, Reinhold Deubel, Altenhain, Taunus, and Thilo Thilenius, Sulzbach, Taunus, Germany, assignors to Farbwerke Hoechst Aktiengesellschaft vormals Meister Lucius & Bruning, Frankfurt am Main, Germany
No Drawing. Filed May 1, 1972, Ser. No. 249,205
Claims priority, application Germany, May 3, 1971, P 21 21 673.9
Int. Cl. C09b 67/00
U.S. Cl. 106—308 N                        9 Claims

ABSTRACT OF THE DISCLOSURE

An aqueous suspension of a pigment is heated with an aralkyl alkylene amine of the formula $$R-(CH_2)_n-NH-[(CH_2)_x-NH]_yH$$

or a salt thereof, wherein R represents a substituted or unsubstituted phenyl, $n$ is an integer from 1 to 10, $x$ is an integer from 2 to 10 and $y$ is an integer from 1 to 5. The resulting pigment compositions are particularly suitable for preparing printing inks which have the advantage of being non-blotting when printed on thin and inferior paper. The pigment compositions also have excellent rheological properties and tinctorial strength.

---

The present invention relates to a process for preparing pigment compositions.

The development of graphic industry in the last years implies higher requirements to be met by printing inks and the pigments employed, due to the use of printing machines, the speed of which has always been increasing. In order to obtain color-intensive prints with these high speed printing machines, pigment dyestuffs of high tinctorial strength and especially good rheological properties are necessary. Therefore, by changing the process of preparation of the pigments and adding suitable auxiliaries, efforts are made to prepare pigment dyestuffs of high tinctorial strength and good rheological properties in printing inks.

Thus, for example, British Patent Specification No. 1,116,567 describes a process for treating azo pigments, which comprises submitting the pigment in the presence of 1–30 percent by weight of aliphatic amines or salts thereof with low-molecular fatty acids to a heat treatment at temperatures of from 80 to 130° C. The pigments thus prepared have considerably improved rheological properties and a much higher tinctorial strength in printing inks.

Furthermore, Dutch Patent Application 6412115 describes a process for preparing easily dispersable pigments having a better resistance to flocculation, wherein after coupling 8–25% of a long-chained aliphatic amine or of a corresponding salt is added to the pigment wetted with water, and heating for several hours up to temperatures of from 70 to 90° C. By addition of cycloaliphatic primary or secondary amines to the pigment suspension according to French Pat. No. 1,538,270 there are also obtained pigments having improved rheological properties in printing inks. A further process for preparing azo dyestuffs having particularly good printing properties by addition of a combination of long-chained aliphatic amines and of an amine oxide or phosphine oxide containing a long-chained hydrocarbon radical is described in British Patent Specification No. 1,182,746. However, the use of these pigments prepared with fatty amines is inconvenient, if such pigment preparations are employed for preparing printing inks to be used for printing thin or inferior paper qualities. When printing such papers, it appears that printing inks on the basis of pigments prepared with fatty amines are blotting. Since, for saving time, there is a strong tendency in practice towards printing on thinner and inferior paper qualities, color-intense pigment preparations having good rheological properties are necessary, which do not have the drawbacks indicated above.

The present invention relates to a process for preparing pigment preparations, which comprises treating pigments or aqueous suspensions thereof with an aralkyl alkylene amine of the general formula $$R-(CH_2)_n-NH-[(CH_2)_x-NH]_yH$$

or salts thereof, whereby R represents a substituted or unsubstituted phenyl radical, $n$ is an integer of from 1 to 10, preferably 1 to 4, $x$ is an integer of from 2 to 10, preferably 2 to 4, and $y$ is an integer of from 1 to 5.

The preparations are prepared by stirring or heating for a long time, if desired under pressure, the pigments or aqueous pigment suspensions with the aralkyl alkylene amine or the salt thereof; the addition of alkali may be suitable.

When preparing pigments of the azo series, the amine or the salt thereof may be added before or during coupling, for example together with the coupling component dissolved in an alkaline medium during alkaline coupling. When coupling in an acidic medium, either an acidic solution of the amine is added to the solution of the diazo component or the coupling component dissolved in an alkaline medium is precipitated with an acidic solution of the amine. Then coupling is effected. It is also possible to add the amine to the coupling mixture during or after the heating process, or to treat the pressed cake of the pigment with the amine in an alkaline solution, if desired under pressure. Finally the pigment is isolated by suction-filtering and subsequent drying.

As pigments which may be prepared according to the above process there are considered all pigments, preferably those of the azo series.

As aralkyl alkylene amines there are considered for example the N-benzyl propylene diamine, the N-β-phenyl ethyl propylene diamine or the N-p-xylyl-propylene diamine as well as further aralkyl alkylene amines of the above formula. The phenyl radical may be unsubstituted or substituted by nitro, halogen, alkoxy or preferably alkyl groups. These aralkyl alkylene amines are prepared according to known methods, for example by catalytic hydrogenation of the addition product of benzyl amine and acrylonitrile; the N-benzyl propylene diamine is obtained.

The quantity of amine added may vary within wide limits according to the pigment used. It amounts to about 1–100%, preferably 5–35%, calculated on the pigment.

The pigment preparations of the present invention are particularly suitable for preparing printing inks. In contradistinction to the preparations known from the above-mentioned state of the art, these preparations are characterized by the fact that the printing inks prepared therefrom do not blot when being printed on thin and inferior papers. Moreover, they have excellent rheological properties and an excellent tinctorial strength.

The following examples illustrate the invention. Parts and percentages are by weight unless stated otherwise.

EXAMPLE 1

55 parts of 1-acetoacetylaminobenzene were dissolved in 1500 parts by volume of water and 42 parts by volume of a 33% sodium hydroxide solution and precipitated with 30 parts by volume of glacial acetic acid. Then the mixture was coupled during 1½ hours at room temperature with a solution of tetrazotized 4,4'-diamino-3,3'-dichloro-diphenyl, which was prepared by adding 60 parts by volume of a 5N sodium nitrate solution to a mixture of 38 parts of 4,4′-diamino-3,3′-dichloro-diphenyl, 183 parts by volume of 5N hydrochloric acid and 520 parts by volume of water. When the coupling was finished, the dyestuff suspension was heated to 98° C., and this temperature was maintained for 15 minutes. Then it was suction-filtered, washed until neutral and the press cake was completed to a volume of 3 liters of water with about 2000 parts by volume of water. The pigment suspension was mixed with 30 parts by volume of a 33% sodium hydroxide solution and 24 parts of N-benzyl-propylene diamine and heated for 4 hours at 98° C. Then the product was filtered, washed until neutral and dried at 60° C.

The printing inks prepared with this preparation have a good low viscosity and show a less marked tendency towards blotting than printing inks containing pigments prepared with fatty amines.

EXAMPLE 2

After heaing to 98° C., the pigment dyestuff prepared according to Example 1 from 55 parts of 1-acetoacetyl-amino benzene and 38 parts of 4,4′-diamino-3,3′-dichloro-phenyl was suction-filtered and washed until neutral. Then the press cake was mixed with water, and after adding 7 parts of a 33% sodium hydroxide solution and 10 parts of N-benzyl-propylene diamine, it was heated for 4 hours in the stirring autoclave at 130° C. A pigment dyestuff was obtained, which practically showed the same good coloristical and rheological properties as the product described in Example 1.

EXAMPLE 3

55 parts of 1-acetoacetylamino benzene were dissolved in 700 parts by volume of water and 42 parts by volume of a 33% sodium hydroxide solution and then precipitated by addition of a solution of 700 parts by volume of water, 47 parts by volume of glacial acetic acid and 24 parts of N-β-phenyl ethyl propylene diamine. Then the product was coupled during 1½ hours at room temperature with a solution of tetrazotized 4,4′-diamino-3,3′-dichloro-diphenyl, which was prepared by adding 60 parts by volume of a 5N sodium nitrite solution to a mixture of 38 parts of 4,4′-diamino-3,3′-dichloro-diphenyl, 183 parts by volume of a 5N hydrochloric acid and 520 parts by volume of water. When coupling was terminated, the dyestuff suspension was heated to 98° C., the mixture was made alkaline with 70 parts by volume of a 33% sodium hydroxide solution, and the temperature was maintained for 4 hours at 98° C. Subsequently the whole was filtered, washed until neutral and dried at 60° C.

The printing ink prepared with the pigment dyestuff showed the same good printing and rheological properties as the pigment preparation according to Example 1.

We claim:

1. A process for preparing an azo dyestuff pigment composition which comprises heating an aqueous suspension of a pigment of the azo dyestuff series with 1 to 100% by weight, calculated on the pigment, of an aralkyl alkylene amine of the formula $$R-(CH_2)_n-NH-[(CH_2)_x-NH]_yH$$

or a salt thereof, wherein R represents a substituted or unsubstituted phenyl, $n$ is an integer from 1 to 10, $x$ is an integer from 2 to 10 and $y$ is an integer from 1 to 5.

2. The process defined in claim 2, wherein the azo pigment is heated with 5 to 35% by weight, calculated on the pigment, of the aralkyl alkylene amine or salt thereof.

3. The process defined in claim 1 wherein the azo pigment is heated with N-benzyl propylene diamine.

4. The process defined in claim 1 wherein the azo pigment is heated with N-β-phenylethyl propylene diamine.

5. The process defined in claim 1 wherein the azo pigment is heated with N-p-xylyl propylene diamine.

6. The process defined in claim 1 wherein alkali is added to the azo pigment suspension.

7. The process defined in claim 6 wherein the alkali is sodium hydroxide.

8. An azo dyestuff pigment composition prepared by process recited in claim 1.

9. A printing ink containing a dyestuff azo pigment composition prepared by the process recited in claim 1.

References Cited

UNITED STATES PATENTS 3,336,147   8/1967   Mitchell et al. _____ 106—288 Q

DELBERT E. GANTZ, Primary Examiner

J. W. HELLWEGE, Assistant Examiner

U.S. Cl. X.R.

106—288 Q